United States Patent [19]

Jacobson et al.

[11] 4,243,624
[45] Jan. 6, 1981

[54] METHOD OF MAKING CATHODES DERIVED FROM AMMONIUM-METAL-CHALCOGEN COMPOUNDS

[75] Inventors: Allan J. Jacobson, Princeton; Russell R. Chianelli, Somerville; M. Stanley Whittingham, Fanwood, all of N.J.

[73] Assignee: Exxon Research & Engineering Co., Florham Park, N.J.

[21] Appl. No.: 40,482

[22] Filed: May 21, 1979

Related U.S. Application Data

[63] Continuation-in-part of Ser. No. 933,451, Aug. 14, 1978, Pat. No. 4,166,160, which is a continuation-in-part of Ser. No. 883,919, Mar. 6, 1978, abandoned.

[51] Int. Cl.$^3$ ............................................. C04B 15/14
[52] U.S. Cl. ..................................... 264/82; 264/104; 429/218
[58] Field of Search ....................... 429/191, 217, 218; 136/238, 240; 264/82, 104, 43, 44

[56] References Cited

U.S. PATENT DOCUMENTS

| | | | |
|---|---|---|---|
| 2,499,192 | 2/1950 | Lafferty | 264/104 |
| 3,382,574 | 5/1968 | Chadwick | 264/104 |
| 3,655,585 | 4/1972 | Dey et al. | 252/506 |
| 3,864,167 | 2/1975 | Broadhead | 136/6 LN |
| 3,915,740 | 10/1975 | Eisenberg | 136/6 LN |
| 4,009,052 | 2/1977 | Whittingham | 429/191 |
| 4,144,384 | 3/1979 | Jacobson et al. | 429/218 |

OTHER PUBLICATIONS

Jour. of Accelerated Brief Communications, Murphy et al., Bell Lab., Mar. 1979, p. 497.
Mat. Res. Bull., vol. 12, pp. 825–830, 1977, "Cathodes for Nonaqueous Li-batteries Based on VS$_2$", Murphy et al.
Jour. of Crystal Growth, 1977, pp. 185–199, "Metal Chalcogenides as Reversible Electrodes in Nonaqueous Li-batteries, Murphy et al.

*Primary Examiner*—Donald J. Arnold
*Attorney, Agent, or Firm*—Kenneth P. Glynn; Robert S. Salzman

[57] ABSTRACT

The present invention is directed to a method of making a cathode, comprising:
(a) forming cathode structure of a predetermined shape with a mixture comprising:
 (i) about 50 to about 100% by weight of one or more ammonium metal chalcogen compounds and complexes, wherein said metal is selected from the group consisting of Ti, V, Cr, Mn, Fe, Nb, Mo, Ta, and W, and wherein said chalcogen is selected from the group consisting of O, S, and Se; and
 (ii) about 50 to about 0% by weight of a binder; and
(b) thermally decomposing and thereby activating said cathode structure at a temperature of about 200° to about 500° C. in a non-oxidizing atmosphere.

12 Claims, No Drawings

METHOD OF MAKING CATHODES DERIVED FROM AMMONIUM-METAL-CHALCOGEN COMPOUNDS

CROSS-REFERENCE TO RELATED APPLICATIONS

This application is a continuation-in-part of copending application Ser. No. 933,451, filed Aug. 14, 1978, now U.S. Pat. No. 4,166,160 which itself was a continuation-in-part of Ser. No. 883,919, filed Mar. 6, 1978, and now abandoned.

BACKGROUND OF THE INVENTION

1. Field of the Invention

The present invention relates to a method of making cathodes for electric current-producing cells, and more particularly to making such cathodes by in situ thermal decomposition of cathodes derived from ammonium metal-chalcogen compounds.

2. Description of the Prior Art

There has been considerable interest in recent years in developing high energy density batteries for voltaic cells. Exemplary of the developing systems is a high energy density electrochemical cell utilizing intercalation compounds of the transition metal chalcogenides as cathode-active materials and using alkali metal anodes, as set forth in U.S. Pat. No. 4,009,052. U.S. Pat. No. 3,915,740 describes a cell having lithium anode-active material and $MoS_x$ (where $2 \leq x \leq 3$) as its cathode-active material, and U.S. Pat. No. 3,864,167 describes some fibrous transition metal trichalcogenides as cathode-active materials. Cell data for $VS_2$ and $V_xFe_{1-x}S_2$ ($x \geq 0.5$) cathodes showing less than or about one lithium per unit cathode material reversible capacity has recently been reported by Murphy et al (*Materials Research Bulletin,* Vol. 12, p. 825 et seq. (1977) and by DiSalvo et al (*Bull. Am. Phys. Soc.,* Vol. 23, p. 244 et seq. (1978)). Also, the mineral patronite, $VS_4$, has been investigated and found to have a capacity for less than one lithium and found to be irreversible by Murphy and Trumbore (*Journal Crystal Growth,* Vol. 39, p. 196 (1977)). U.S. Pat. No. 3,655,585 describes a method of making cathodes of cathode-active material vanadium pentoxide by the thermal decomposition of ammonium vanadate in an apparently oxidizing environment.

Recently, D. W. Murphy et al (*J. Electrochem Soc.* Vol. 126 p. 497 (March, 1979)) described the preparation of $V_6O_{13}$ ($VO_{2.167}$) by reaction of $V_2O_5$ and V at 650° C. and alternatively by thermal decomposition of $NH_4VO_3$ in an inert atmosphere below 450° C. However, the present invention is believed to antedate this disclosure as evidenced by many of the examples and the disclosure of the parent application hereof.

U.S. Pat. No. 4,144,384, Jacobson et al, describes some specific embodiments of the present invention but has issued to the same inventive entity as in the present application. Further, the present invention antedates U.S. Pat. No. 4,144,384, which discloses but does not claim the present invention.

SUMMARY OF THE INVENTION

The present invention is directed to a method of making cathodes for electric current producing cells, which method includes:

(a) forming cathode structure of a predetermined shape with a mixture comprising:

(i) about 50 to about 100% by weight of one or more ammonium metal chalcogen compounds and complexes, wherein said metal is selected from the group consisting of Ti, V, Cr, Mn, Fe, Nb, Mo, Ta and W, and wherein said chalcogen is selected from the group consisting of O, S, and Se; and (ii) about 50 to about 0% by weight of binder, based on the total weight of the ammonium metal chalcogen compounds and complexes and the binder; and (b) thermally decomposing and thereby activating said cathode structure at a temperature of about 200° C. to about 500° C. in a non-oxidizing atmosphere.

DETAILED DESCRIPTION OF THE INVENTION

The method of the present invention involves in situ formation of a cathode and includes formation of the cathode structure into a predetermined shape using a mixture containing selected precursor(s) to cathode-active material(s) and conventional binders. The cathode structure is then exposed to elevated temperatures whereby the precursor is thermally decomposed and activated material is formed.

The precursors to the cathode-active materials created in situ in the present invention are selected ammonium metal chalcogen compounds and complexes more fully described below. The binders employed therewith are any conventional binders and include polyfluoroethylene, polyethylene, and polypropylene.

In general, the cathode structure is formed into a predetermined shape using a mixture containing about 50 to about 100% by weight of the ammonium compound(s) and/or complex(es) and preferably about 70 to about 100% by weight of same, based on the weight of such compounds and complexes and, the binder, when included. Thus, about 0 to about 50% by weight, and preferably about 0 to about 30% by weight of binder may be employed.

The cathode structure which is formed may optionally include non-conductive or conductive support structures, e.g., metal screen current collectors, as are well known in the art. Additionally, conductive diluents, although not necessary, may be included, e.g., carbon or other material.

Once the cathode structure is formed, it is subjected to elevated temperatures of about 200° to about 500° C., and preferably about 250° to about 400° C. in a non-oxidizing atmosphere. This heat treatment is effected for a sufficient time to thermally decompose the cathode active material precursor into its non-ammonium-containing chalcogen compound or complex and to thus activate the cathode. Thermal decomposition is generally evidenced by a color change and may begin to occur within less than a minute under the above-described heat treatment. However, although not critical to the present invention, the heat treatment may be effected up to about 4 hours as a practical matter. Less treatment time may result in only partial activation and more treatment time may result in no additional benefit.

The precursor ammonium metal chalcogen compounds and complexes employed in the method of the present invention are those wherein the metal is selected from the group consisting of Ti, V, Cr, Mn, Fe, Nb, Mo, Ta, and W. Desirably, the metal is selected from the group consisting of Ti, V, Cr, Mn, Mo, and Nb, and preferably is selected from the group consisting of V, Cr, Mn, and Mo. The chalcogen is selected from the group consisting of O, Se, and S. The precursor includes compounds and complexes and includes any compounds and complexes which contain the ammonium group, one or more of the mentioned metals, and one or more of the mentioned chalcogens, provided, however, that such compounds and complexes can be decomposed thermally into cathode-active material at the above specified temperatures.

Among the many precursor compounds and complexes which may be employed are:
$(NH_4)_2MoO_4$
$(NH_4)_2MoSe_4$
$(NH_4)_2MoS_4$
$(NH_4)_2WO_4$
$(NH_4)_2WSe_4$
$(NH_4)_2WS_4$
$(NH_4)_3VO_4$
$(NH_4)_3VSe_4$
$(NH_4)_3VS_4$
$(NH_4)_3NbO_4$
$(NH_4)_3NbSe_4$
$(NH_4)_3NbS_4$
$(NH_4)_3TaO_4$
$(NH_4)_3TaSe_4$
$(NH_4)_3TaS_4$
$NH_4VO_3$
$(NH_4)_aMnO_2$ with $0.5 \leq a \leq 1.4$
$(NH_4)_2CrO_4$
$(NH_4)_2Cr_2O_7$
$(NH_4)_2MoO_2S_2$
$(NH_4)_2TiO(C_2O_4)_2$
$(NH_4)_3Fe(C_2O_4)_3 \cdot 3H_2O$
$(NH_4)_3VS_3Se$
$H(NH_4)_2VS_4$ Other compounds and complexes should now be apparent to the artisan. In addition, compounds and complexes having slightly non-stoichiometric amounts of elements may be employed as well as substituted ammonium compounds (including amine type compounds) and organically linked ammonium group compounds. To exemplify, molybdenum compounds may include those listed above as well as those represented by the following:

(i) those having the formula:

$$(NH_4)_x MoZ_y \qquad (1)$$

wherein Z is a chalcogen selected from the group consisting of oxygen, sulfur, selenium, sulfur-selenium mixtures, sulfur-oxygen mixtures and selenium-oxygen mixtures, wherein x is a numerical value of about 2, and wherein y is a numerical value of about 4;

(ii) compounds of the above formula wherein one or more hydrogens are substituted with a radical selected from alkyl radicals having 1 to 20 carbon atoms and alkyl amine radicals having 1 to 20 carbon atoms;

(iii) those having the formula:

$$(NH_3-R-NH_3)MoZ_y \qquad (2)$$

wherein R is a methylene radical or a polymethylene radical having 2 to 20 carbon atoms, and wherein Z and y are as defined: Examples include:
$(NH_3CH_3)_2MoS_4$
$(NH_3CH_3)(NH_3C_2H_5)MoS_2O_2$
$(NH_3C_8H_{17})(NH_4)MoSe_4$
$(NH_3C_2H_4NH_2)_2MoS_4$
$(NH_3C_2H_4NH_3)MoS_4$
$(NH_3C_{10}H_{20}NH_3)MoSe_4$
and the like. It should now be clear to the artisan that various homolog and analog compounds of the foregoing and of those employing metals other than molybdenum are intended to be included here commensurate with the scope of the invention.

The above-mentioned precursor cathode compounds and complexes may be prepared by known techniques and are believed to be within the purview of the artisan. For example, ammonium thiomolybdate, substituted ammonium thiomolybdate, ammonium thiovanadate or substituted ammonium thiovanadate may be formed by passing sulfurous vapors through a solution of ammonium molybdate, substituted ammonium molybdate or the vanadates, respectively. Analogous methods may be employed to obtain other compounds and complexes employed in the method of the present invention and are, as mentioned, well known.

It should be noted that in general, when the cathode structures have been treated thermally in accordance with the present invention, they may be characterized as generally having increased electrical conductivity relative to the starting ammonium compounds, thus minimizing the need for the addition of conductive diluents such as carbon.

The cathodes made by the method of the present invention may be advantageously employed in electrical current-producing cells containing specified anodes and electrolytes so as to achieve high energy densities, to also be capable of being cycled through charging and discharging, and to be readily produced on a large-scale basis.

In general, the anode employed in such a cell is one which contains as its anode-active material one or more metals selected from the group consisting of the Periodic Table Group IA metals, Group IB metals, Group IIA metals and Group IIB metals as well as alloys containing these. The Group IA metals, also known as the alkali metals, are most desirable. Preferred is the anode having as its anode-active material a metal selected from the group consisting of lithium and sodium, and most preferably lithium, as well as their alloys, e.g., Li-Al. The anode-active material may be in contact with other metal structures in the cell, depending upon the particular anode-active material being used. Thus, for example, some anode-active materials are self-supporting and may also serve as current collectors whereas other anode-active materials, e.g., lithium, may be in contact with other metal structures, such as nickel, copper or silver screen, which serve as current collectors. These anode configurations are a matter of design depending upon the particular anode-active material being used and are well known in the art.

The electrolyte used in such a cell is any electrolyte which is chemically inert with respect to the anode and with respect to the cathode, and which permits the migration of ions between the anode and the cathode. In general, the choice of electrolyte depends upon the anode-active material being used in the cell. Thus, where the anode-active material is a Group IA metal, the electrolyte will most likely be nonaqueous. However, where the anode-active material is one which is selected, for example, from the Group IIB metals, an aqueous electrolyte may be employed. When the preferred anode-active material selected from the Group IA metals is used in a cell, the electrolyte may typically be a nonaqueous alkali metal salt-organic solvent electrolyte solution. These alkali metal salts are well known in the art and need not be enumerated herein. However, such salts include the lithium and sodium salt complexes which are dissolved in organic solents such as the inertly substituted and unsubstituted ethers, sulfones, organic sulfates, organic sulfites, organic nitrites and organic nitro compounds. One preferred electrolyte for use in conjunction with cells containing lithium as its anode-active material is an electrolyte containing lithium perchlorate salt dissolved in dioxolane or a dioxolane-containing solution. One preferred electrolyte in cells containing sodium as its anode-active material contains sodium triethyl pyrrole boron dissolved in a cyclic ether containing solution. Alternatively, solid electrolytes, such as the beta aluminas or halides, or molten salts, may be used.

The present invention is illustrated by the following examples, but the invention should not be construed by being limited thereto.

EXAMPLE 1

Ammonium thiovanadate was precipitated from an aqueous solution of sodium pyrovanadate ($Na_4V_2O_7$) and ammonium sulfide by bubbling hydrogen sulfide through it. This precipitate was filtered under nitrogen and washed with a small amount of ethanol. This ammonium thiovanadate was mixed with 10 wt. % polyfluoroethylene powder and pressed into an expanded stainless steel grid at room temperature and then heated to about 300° C. for about 4 minutes in nitrogen. The grid had about 2 $cm^2$ of active cathode material. A cell was then prepared by surrounding the cathode screen with polypropylene separators and then pure lithium metal which served as the anode. This assembly was then immersed in a 2 molar solution of lithium perchlorate in dioxolane. The cell was then discharged at 1 ma to a cut-off of 1.40 volts. The capacity on the first discharge was 1.48 kilocoulombs/gm of cathode material. The cell was then repetitively cycled more than twenty times between 1.40 and 2.80 volts at 1 ma discharge current and 0.5 ma charge current showing its high reversibility.

EXAMPLE 2

A cathode and cell were constructed and tested as in Example 1 except that the discharge current was 5 ma. The initial capacity was 1.31 kilocoulombs/gm of cathode material. The cell was recharged to 2.80 volts at 0.5 ma and then repetitively cycled more than twenty times between 1.40 and 2.80 volts showing its high reversibility at the 5 ma discharge rate.

EXAMPLE 3

A cathode and a cell were constructed as in Example 1. This cell was discharged at currents of 20 ma, 10 ma, 4 ma, 2 ma and 1 ma successively to a lower cut-off voltage of 1.40 volts, with 30 min. rests under open circuit conditions between each discharge. The coulombic capacity for each discharge was measured and was respectively 1.18 kilocoulombs/gm of cathode material (20 ma), 0.21 kilocoulombs/gm (10 ma), 0.08 kilocoulombs/gm (4 ma), 0.04 kilocoulombs/gm (2 ma) and 0.03 kilocoulombs/gm (1 ma). The total capacity on discharge was 1.54 kilocoulombs/gm and 76.6% of this capacity was obtained at 20 ma.

EXAMPLE 4

A cathode and a cell were constructed as in Example 1 except that the electrolyte was a 1.6 molar solution of sodium triethyl pyrrole boron in dioxolane and the anode was sodium pressed into an expanded stainless steel screen. The initial open circuit voltage was 2.13 volts and the cell was discharged at 1 ma to a capacity of 0.44 kilocoulombs/gm of cathode material.

EXAMPLE 5

Ammonium thiomolybdate was precipitated from an ammoniacal aqueous solution of ammonium molybdate by bubbling hydrogen sulfide through it. This precipitate was filtered under nitrogen. It was then mixed with 20 wt. % carbon and 10 wt. % polyfluoroethylene powder and pressed into an expanded stainless steel grid first at room temperature and then at 300° C. in nitrogen. The grid had about 2 $cm^2$ of active cathode material. A cell was then prepared by surrounding the cathode screen with polypropylene separators and then pure lithium metal which served as the anode. This assembly was then immersed into a 2 molar solution of lithium perchlorate in dioxolane. The cell was then discharged at 1 ma to a cut-off of 1.4 volts; about 75% of the capacity was obtained between 1.75 and 2.0 volts. The capacity on the first discharge was 1.78 kilocoulombs/gm of thiomolybdate. The cell was then repetitively cycled more than twenty times between 1.40 and 2.70 volts showing its high reversibility.

EXAMPLE 6

A cathode and a cell constructed and tested just as in Example 5 except that no carbon was added as a conductive diluent, showed similar electrochemical characteristics with a capacity of 1.73 kilocoulombs/gm. Ready reversibility was also observed, thus indicating that it is not necessary to add conductive diluent to cells containing ammonium thiomolybdate as a cathode active material and prepared in this manner.

EXAMPLE 7

A cathode and a cell were constructed as in Example 5 except that the electrolyte was a 1 molar solution of sodium triethyl pyrrole boron in dioxolane and the anode was sodium pressed into an expanded stainless steel screen. The initial open circuit voltage was 2.23 volts, and under discharge at 1 ma, 1.35 kilocoulombs of capacity/gm of thiomolybdate were obtained between 2.2 volts and 1.25 volts. More than ten discharge cycles were obtained between 1.25 and 2.5 volts showing that this sodium cell is also highly reversible.

EXAMPLE 8

The ethylene diamine salt of thiomolybdate was prepared by addition of 15 cc of ethylene diamine to 2 gm of ammonium thiomolybdate. 60 ml of methanol were then added giving an orange precipitate; after washing with hot methanol. The red ethylene diamine thiomolybdate was collected. This was then formed into a cathode as in Example 1 and was discharged and charged more than 50 times showing its high reversibility.

The dodecamine salt of thiomolybdate was prepared by the reaction between 2.6 gm of ammonium thiomolybdate and 4.4 gms of dodecamine hydrochloride in 100 cc of methanol. The orange solid precipitate was formed into a cathode as in Example 5 and was cycled more than 40 times, again indicating the high reversibility of cathodes derived from these substituted ammonium thiomolybdates.

EXAMPLE 9

Ammonium thiotungstate, $(NH_4)_2WS_4$, was mixed with 10 wt. % of polyflouroethylene powder and pressed into a stainless steel grid at room temperature and then heated to 300° C. for about five minutes. A cell was then prepared by surrounding the cathode screen with polypropylene separators and then pure lithium metal which served as the anode. This assembly was then immersed in a 2 molar solution of lithium perchlorate in dioxolane. The cell was then discharged at 1 ma to a cut-off of 1.40 volts. The capacity on first discharge was 0.68 kilocoulombs/gm of cathode material.

EXAMPLE 10

Ammonium paratungstate, $(NH_4)_6W_7O_{24}.6H_2O$, was mixed with 8.8 wt. % polyfluoroethylene and pressed into a stainless steel grid at room temperature and then heated to about 340° C. for close to 12 minutes. A cell was prepared as described in Example 9. The cell was discharged at 1 ma to a lower cut-off voltage of 1.40 volts. The capacity on first discharge was 202 coulombs/gm of cathode material.

EXAMPLE 11

Ammonium metavanadate, $NH_4VO_3$, was mixed with 10 wt. % polyfluoroethylene and pressed into a stainless steel grid at room temperature and then heated to 340° C. in nitrogen for about 8 minutes. A cell was prepared as described in Example 9. The cell was discharged at 1 ma to a lower cut-off voltage of 1.40 volts. The capacity on first discharge was 292 coulombs/gm cathode. More than 95% of this capacity was obtained between 3.4 and 2.4 volts.

EXAMPLE 12

Ammonium vanadate is mixed with an aqueous solution of Teflon to give a paste. This paste is then spread into a metal grid and the whole dried. This cathode structure is then heated to about 400° C. in a nitrogen or hydrogen atmosphere for around three hours. This procedure gives an electronically conducting vanadium oxide cathode.

What is claimed is:
1. A method of making a cathode, comprising:
(a) forming cathode structure of a predetermined shape with a mixture comprising:
  (i) about 50 to about 100% by weight of one or more ammonium metal chalcogen compounds and complexes, wherein said metal is selected from the group consisting of Ti, V, Cr, Mn, Fe, Nb, Mo, Ta, and W, and wherein said chalcogen is selected from the group consisting of O, S, and Se; and
  (ii) about 50 to about 0% by weight of a binder; and
(b) thermally decomposing and thereby activating said cathode structure at a temperature of about 200° to about 500° C. in a non-oxidizing atmosphere.
2. The method of claim 1 wherein said ammonium metal chalcogen compounds and complexes are selected from the group consisting of Ti, V, Cr, Mn, Mo, and Nb.
3. The method of claim 1 wherein said thermal decomposition temperature is about 250° to about 400° C.
4. The method of claim 1, 2, or 3 wherein said non-oxidizing atmosphere is an inert atmosphere.
5. The method of claim 1, 2, or 3 wherein said non-oxidizing atmosphere is a reducing atmosphere.
6. The method of claim 4 or 5 wherein said ammonium metal chalcogen compounds and complexes are selected from the group consisting of V, Cr, Mn, and Mo.
7. The method of claim 1 wherein about 70 to about 100% by weight of said compounds and complexes, and about 30 to about 0% by weight of binder, are employed.
8. The method of claim 7 wherein said ammonium metal chalcogen compounds and complexes are selected from the group consisting of Ti, V, Cr, Mn, Mo, and Nb.
9. The method of claim 7 wherein said thermal decomposition temperature is about 250° to about 400° C.
10. The method of claim 7, 8, or 9 wherein said non-oxidizing atmosphere is an inert atmosphere.
11. The method of claim 7, 8, or 9 wherein said non-oxidizing atmosphere is a reducing atmosphere.
12. The method of claim 10 or 11 wherein said ammonium metal chalcogen compounds and complexes are selected from the group consisting of V, Cr, Mn and Mo.

* * * * *